United States Patent
Eck et al.

(10) Patent No.: US 12,420,912 B2
(45) Date of Patent: Sep. 23, 2025

(54) SHAFT CONNECTION

(71) Applicant: WITTENSTEIN SE, Igersheim (DE)

(72) Inventors: Alexander Eck, Kirchheim (DE); Nikolai Seitz, Gerchsheim (DE)

(73) Assignee: WITTENSTEIN SE, Igersheim (DE)

( * ) Notice: Subject to any disclaimer, the term of this patent is extended or adjusted under 35 U.S.C. 154(b) by 0 days.

(21) Appl. No.: 18/420,029

(22) Filed: Jan. 23, 2024

(65) Prior Publication Data
US 2024/0246659 A1 Jul. 25, 2024

(30) Foreign Application Priority Data
Jan. 24, 2023 (DE) .......................... 102023101673.3

(51) Int. Cl.
*B64C 13/30* (2006.01)
(52) U.S. Cl.
CPC .................................. *B64C 13/30* (2013.01)
(58) Field of Classification Search
CPC ... B64C 13/30; F16D 3/62; F16D 3/72; F16D 11/14; F16D 3/06
See application file for complete search history.

(56) References Cited

U.S. PATENT DOCUMENTS

| | | | |
|---|---|---|---|
| 6,443,864 B1 * | 9/2002 | Friedmann | F16H 55/56 |
| | | | 474/18 |
| 2006/0042908 A1 * | 3/2006 | Ronk | F16D 48/066 |
| | | | 192/85.63 |
| 2020/0096049 A1 * | 3/2020 | Lebas | F16D 3/60 |
| 2022/0073187 A1 | 3/2022 | Werquin et al. | |

FOREIGN PATENT DOCUMENTS

| | | | |
|---|---|---|---|
| DE | 10051587 A1 | 5/2001 | |
| DE | 10046440 A1 | 3/2002 | |
| DE | 102013226053 A1 | 6/2015 | |
| FR | 3064317 A1 * | 9/2018 | ............ B60K 17/02 |
| JP | 2007314133 A | 12/2007 | |
| WO | 2020128403 A1 | 6/2020 | |

OTHER PUBLICATIONS

German Search Report Dated May 2, 2023 for corresponding application DE 10 2023 101 673.3.
European Search Report dated Jun. 25, 2024 issued in corresponding EP Application 24153377.7.

* cited by examiner

*Primary Examiner* — Justin M Benedik
(74) *Attorney, Agent, or Firm* — Bachman & LaPointe, P.C.

(57) ABSTRACT

Shaft connection (1) having a first shaft (5) which is rotatable about an axis of rotation (3), a second shaft (7) which is arranged coaxially with the first shaft (5) and which is movable axially relative to the first shaft (5), and at least one spring element pair (9), in each case having a first spring element (11) and a second spring element (13), wherein the first spring element (11) and the second spring element (13) are each fastened to the first shaft (5) and to the second shaft (7), and wherein the first spring element (11) and the second spring element (13) are arranged axially offset relative to one another.

15 Claims, 5 Drawing Sheets

SHAFT CONNECTION

FIELD OF THE INVENTION

The disclosure relates to a shaft connection, to a coupling and to the use of a shaft connection or of a coupling.

PRIOR ART

Shaft connections or couplings are known from the prior art, wherein two shafts are connected via a spring. The spring can produce a restoring force in an axial direction on one of the two shafts in relation to another of the two shafts. By way of example, WO 2020/128403 A1 discloses a force generating device for an aircraft control stick, wherein an actuator can be moved by an electromagnet, and wherein a spring exerts a return force on the actuator.

However, shaft connections or couplings known from the prior art have restrictions, in particular in relation to a torsional stiffness of shaft connections or in relation to an axial lifting force provided by the shaft connection.

SUMMARY OF THE INVENTION

It is an object of the disclosure to specify a shaft connection, a coupling and the use of a shaft connection or of a coupling which are improved in relation to the prior art. In particular, the intention is to specify a shaft connection which has a high torsional stiffness or requires a low axial lifting force.

The object is achieved by a shaft connection and a coupling and the use as disclosed herein and/or according to the alternative independent claims.

According to one aspect, a shaft connection is specified. The shaft connection comprises a first shaft which is rotatable about an axis of rotation, a second shaft which is arranged coaxially with the first shaft and which is movable axially relative to the first shaft, and at least one spring element pair, in each case comprising a first spring element and a second spring element, wherein the first spring element and the second spring element are each fastened to the first shaft and to the second shaft, and wherein the first spring element and the second spring element are arranged axially offset relative to one another.

According to another aspect, a coupling is specified. The coupling comprises a shaft connection according to one of the embodiments described herein, and a rotor shaft arranged coaxially with the first shaft and the second shaft, wherein, for the coupling of the first shaft and the second shaft to the rotor shaft, the coupling is configured to move the second shaft axially in the direction of the rotor shaft.

According to yet another aspect, the use of a shaft connection according to one of the embodiments described herein or of a coupling according to one of the embodiments described herein is specified, comprising moving the second shaft relative to the first shaft in an axial direction.

In typical embodiments, the shaft connection comprises a first shaft. Typically, the first shaft of the shaft connection is rotatable about an axis of rotation. The terms "axially", "coaxially", "radially" and "in the circumferential direction" herein relate in particular to the axis of rotation. An axial direction should in particular be understood to mean a direction of the axis of rotation. Typically, the shaft connection comprises a second shaft. In typical embodiments, the first shaft and the second shaft are arranged coaxially. In typical embodiments, the first shaft is an output shaft. The second shaft is typically a drive shaft. In further typical embodiments, the first shaft may be a drive shaft and the second shaft an output shaft. In typical embodiments, the first shaft or the second shaft is in the form of a hollow shaft, in particular of circular-ring shape. In further typical embodiments, the first shaft or the second shaft is in the form of a solid shaft. Typically, the first shaft and the second shaft are produced from metal.

In typical embodiments, the shaft connection comprises at least one spring element pair. Typically, a first spring element and a second spring element form a spring element pair. In embodiments, the first spring element and the second spring element are identical. Typically, the first shaft and the second shaft are connected to one another via the at least one spring element pair, in particular connected to one another for conjoint rotation.

Typically, the first spring element and the second spring element of a spring element pair are each fastened to the first shaft and to the second shaft, in particular by way of non-positively locking or positively locking fastening means such as screws or rivets. In embodiments, the first shaft and the second shaft may have stepped planar faces for fastening of the at least one spring element pair.

Typically, the first spring element and the second spring element of the at least one spring element pair are arranged axially offset relative to one another. In particular, the first spring element and the second spring element are arranged axially spaced apart from one another. An axial spacing between one spring element of a spring element pair and the first shaft or the second shaft may be provided, for example, by an axial spacer, which is arranged at the fastening position of the spring element between the spring element and the first shaft or the second shaft. Spacers may be configured as part of fastening means for fastening the spring elements to the first shaft and to the second shaft. An axial spacing between the spring elements of a spring element pair may be provided by different spacings of the spring elements to the first shaft or the second shaft. Different axial spacings of the spring elements to the first shaft or the second shaft may be provided, for example, by the use of different spacers at the fastening positions of the spring elements.

In typical embodiments, the first spring element is configured to be subjected to tensile loading in a first direction of rotation of the first shaft and of the second shaft. Typically, the second spring element is configured to be subjected to tensile loading in a second direction of rotation, which differs from the first direction of rotation, of the first shaft and of the second shaft. In embodiments, at least one spring element pair can in particular be arranged in such a way that, when the first shaft and the second shaft are rotating, one spring element of the spring element pair is always subjected to tensile loading irrespective of the direction of rotation, whilst the other spring element of the spring element pair is subjected to compressive loading. Embodiments can in particular have a high torsional stiffness in both directions of rotation about the axis of rotation. By way of example, a high torsional stiffness can be achieved without needing to design a spring element of particularly solid form to avoid buckling under compressive loading.

Typically, the second shaft is movable axially relative to the first shaft. Typically, the movability of the second shaft relative to the first shaft in the axial direction is limited. Typically, the movability of the second shaft axially in the direction of the first shaft is limited by a stop of the first shaft or by a maximum deflection position of the at least one spring element pair in the direction of the first shaft. Typically, the movability of the second shaft in the axial direction away from the first shaft is limited by the at least one spring element pair. Typically, the maximum axial deflection away from the first shaft by the second shaft relative to the first shaft is limited or predetermined by an axial spacing between the first spring element and the second spring element, wherein the axial spacing between the first spring element and the second spring element refers to the axial spacing in a non-deflected state of the first spring element and of the second spring element.

In typical embodiments, the first spring element and the second spring element are each in the form of a leaf spring. Typically, a leaf spring has two parallel flat sides. A thickness of the leaf spring, measured between the two flat sides, is typically smaller than a length or a width of the leaf spring, in particular at least five times or at least ten times smaller. Typically, a leaf spring is of elongate form. By way of example, the length of the leaf spring may be at least twice as great as the width of the leaf spring, in particular at least three times as great or at least four times as great. In typical embodiments, a leaf spring is produced from metal, in particular from spring steel sheet.

Typically, a respective leaf spring of the first spring element or of the second spring element is oriented at least substantially parallel to a plane, orthogonal to the axis of rotation, or a planar face of the first shaft or of the second shaft, in particular if the leaf spring is not deflected from the rest position of the leaf spring. Typically, the flat sides of the leaf spring are oriented at least substantially parallel to a plane orthogonal to the axis of rotation. An at least substantially parallel orientation should in particular be understood to mean a deviation of at most 10 degrees, in particular of at most 5 degrees or of at most 2 degrees.

According to typical embodiments, a respective leaf spring of the first spring element or of the second spring element is of arcuate form, in particular of circular-arc-shaped or banana-shaped form. The leaf spring may for example, be substantially in the form of a circular ring segment. Typically, the leaf spring is of arcuate form in a longitudinal direction of the leaf spring. Typically, the leaf spring is arranged in the shaft connection so as to be curved radially outward. In embodiments, the leaf spring extends substantially in the circumferential direction about the axis of rotation. In embodiments, an arc center point of an arcuate leaf spring lies radially inside of the radially innermost fastening position of the at least one spring element pair. With arcuate spring elements, when the first shaft or the second shaft is embodied as a hollow shaft, it is for example possible to provide a greater inner diameter of the first shaft or of the second shaft. In further typical embodiments, a respective leaf spring of the first spring element or of the second spring element is of rectilinear form. A rectilinear design can provide a higher rotary stiffness of the leaf spring.

In typical embodiments, the first spring element and the second spring element of a spring element pair are arranged in a crossed manner. In particular, the first spring element and the second spring element cross in a view along the axis of rotation. The first spring element and the second spring element may cross in a symmetrical manner. The crossed arrangement of the spring elements can provide a high stiffness that is independent of the direction of rotation. In embodiments, the first spring element is fastened to the first shaft at a first fastening position and to the second shaft at a second fastening position provided radially inside of the first fastening position. Typically, the second spring element is fastened to the first shaft at a third fastening position and to the second shaft at a fourth fastening position provided radially inside of the third fastening position. Typically, the third fastening position is arranged offset relative to the first fastening position by a first angle in a first circumferential direction. Typically, the fourth fastening position is arranged offset relative to the second fastening position by a second angle in a second circumferential direction that differs from the first circumferential direction.

In typical embodiments, the first spring element and the second spring element each extend over the same angular range about the axis of rotation. Typically, the angular range comprises at least 60 degrees, in particular at least 70 degrees, or at most 130 degrees, in particular at most 120 degrees. In particular, the angular range can comprise at least 70 degrees and at most 120 degrees, for example approximately 90 degrees. A large spring length of the spring elements can for example provide a low restoring force of the spring elements. A low restoring force can provide a soft axial connection between the first shaft and the second shaft, such that in particular a lifting device configured for the axial moving of the second shaft requires only a small lifting force to overcome the restoring force. Typically, the first fastening position of the first spring element and the fourth fastening position of the second spring element are arranged at a first angular position with respect to the axis of rotation. Typically, the second fastening position of the first spring element and the third fastening position of the second spring element are arranged at a second angular position that differs from the first angular position. Typically, the first angular position and the second angular position enclose one of the angular ranges described herein.

According to typical embodiments, the first spring element and the second spring element each have a fastening position on a first circle about the axis of rotation on the first shaft. Typically, the first spring element and the second spring element each have a further fastening position on a second circle about the axis of rotation on the second shaft. The fastening position and the further fastening position of a spring element typically lie at opposite ends of the spring element. Typically, the first circle and the second circle have different radii. By way of example, in embodiments the first circle has a greater radius than the second circle. In particular, the first fastening position of the first spring element and the third fastening position of the second spring element can be provided on the first circle about the axis of rotation. The second fastening position of the first spring element and the fourth fastening position of the second spring element can be provided on the second circle about the axis of rotation. In further typical embodiments, the first circle can have a smaller radius than the second circle.

In typical embodiments, the shaft connection comprises at least two spring element pairs, in particular at least three spring element pairs. By way of example, the shaft connection can comprise exactly two, exactly three or exactly four spring element pairs. The number of spring element pairs may be selected, for example, in dependence on an axial travel to be provided for the second shaft or on a torque to be transmitted. In an exemplary embodiment, the shaft connection has exactly three spring element pairs. In particular, a large axial travel can be achieved and a high torque can be transmitted.

In typical embodiments with more than one spring element pair, each spring element pair comprises a first spring element and a second spring element, in particular a first spring element and a second spring element according to embodiments described herein. Typically, all the first spring elements of the shaft connection are identical. Typically, all the second spring elements of the shaft connection are identical. In particular, all the first spring elements and all the second spring elements can be identical. In embodiments, the at least two spring element pairs are arranged distributed in the circumferential direction about the axis of rotation, in particular are arranged distributed uniformly in the circumferential direction. Typically, the at least two spring element pairs are arranged separately from one another in the circumferential direction, in particular without an overlap of the spring element pairs in the circumferential direction.

According to embodiments, the first shaft and the second shaft are arranged one behind the other in an axial direction. In embodiments, a radial extent of the first shaft and a radial extent of the second shaft can each comprise an overlapping radial region. The first shaft and the second shaft can be arranged axially one behind the other in the overlapping radial region. The first spring element and the second spring element can be fastened to the first shaft or to the second shaft in the overlapping radial region. In particular, the fastening positions of the first spring element and of the second spring element on the first shaft and on the second shaft can be provided in the overlapping radial region.

Typically, the second shaft is movable in the axial direction relative to the first shaft. Typically, the second shaft is movable in the axial direction relative to the first shaft at least between two axial positions, in particular between a first axial position and a second axial position. The first axial position can be an axial position close to the first shaft, in particular at an axial stop of the housing or of the first shaft, or a rest position in which the at least one spring element pair is in an axially non-loaded state with respect to the first shaft. The second axial position is typically further away from the first shaft than the first axial position.

Typically, the second shaft is movable in the axial direction under the action of a spring force generated by the at least one spring element pair. The spring force can herein in particular also be referred to as restoring force of the at least one spring element pair. In particular, the at least one spring element pair is typically configured to produce a restoring force on the second shaft during an axial movement of the second shaft relative to the first shaft. Typically, the at least one spring element pair is configured to produce a restoring force on the second shaft in the direction of the first axial position during a deflection or movement of the second shaft from the first axial position to the second axial position. When positioning the second shaft at the second axial position, the deflection of the spring elements can in particular provide a freedom from play between the first shaft and the second shaft. In further embodiments, the at least one spring element pair can be configured to produce a restoring force on the second shaft in the direction of the second axial position during a deflection or movement of the second shaft in the axial direction from the second axial position toward the first axial position.

According to typical embodiments, a maximum axial deflection of the second shaft relative to the first shaft is determined or limited by the arrangement and shape of the first spring element and of the second spring element, in particular by the axial spacing between the first spring element and the second spring element. The maximum axial deflection of the second shaft can in particular correspond to the axial spacing between the first spring element and the second spring element.

In embodiments, the second shaft has a toothing. Typically, the toothing is provided on that side of the second shaft which faces away from the first shaft. The toothing may for example, be a spur toothing or crown toothing, in particular a Hirth toothing.

According to typical embodiments, a coupling comprises a shaft connection according to one of the embodiments described herein. Typically, the first shaft and the second shaft of the shaft connection are connected to one another in an at least substantially play-free manner or in an at least substantially torsionally stiff manner by the at least one spring element pair of the shaft connection. Typical couplings can be configured for an actuator in an aircraft, for example for an actuator of an aircraft control system.

Typically, the coupling comprises a rotor shaft arranged coaxially with the first shaft and the second shaft. The coupling can comprise a housing which in particular at least partially engages around the rotor shaft. The rotor shaft is typically arranged so as to not be movable in the axial direction with respect to the first shaft. The coupling is typically configured to couple the first shaft and the second shaft to the rotor shaft. Typically, the coupling is configured to move the second shaft axially in the direction of the rotor shaft, in order to couple the first shaft and the second shaft to the rotor shaft. Typically, for the decoupling of the rotor shaft from the first shaft and the second shaft, the second shaft can be moved in the axial direction away from the rotor shaft. The rotor shaft can typically be connected to the shaft of a drive, in particular of an electric motor or of a hydraulic unit.

Typically, the second shaft can be arranged at a first axial position in which the rotor shaft is decoupled from the first shaft and the second shaft. Typically, the second shaft can be arranged at a second axial position in which the rotor shaft is coupled to the first shaft and the second shaft. In particular, when the second shaft is arranged at the second axial position, the second shaft and the rotor shaft can come into direct contact and can for example be connected in a frictionally locking or positively locking manner. In embodiments, the second shaft has a first toothing. The rotor shaft typically has a second toothing configured to engage with the first toothing. The first toothing and the second toothing may each for example be a spur toothing or a crown toothing, in particular a Hirth toothing.

In typical embodiments, the coupling comprises a lifting device for moving the second shaft in the axial direction by means of a lifting force generated by the lifting device. According to typical embodiments, the lifting device comprises an electromagnet, in particular one or more magnet coils. The electromagnet can be arranged in a housing of the coupling. The electromagnet is typically configured to move the second shaft counter to a restoring force of the at least one spring element pair from a first axial position to a second axial position. The first axial position and the second axial position can be provided with respect to the first shaft and the rotor shaft according to embodiments described herein. The movement between the first axial position and the second axial position can also be referred to herein as "travel" or as "axial travel". Typically, the coupling is configured to carry out a defined axial travel of the second shaft for coupling or decoupling.

Typically, when the second shaft is arranged at the second axial position, the restoring force acts in the direction of the first axial position. Typically, a magnetic force of the electromagnet, which is exerted on a second shaft arranged at the first axial position, acts in the direction of the second axial position. The magnetic force is typically exerted when the electromagnet is energized. The magnetic force can be produced by way of a magnetic circuit. The magnetic circuit can comprise the electromagnet, the second shaft and for example the housing or the rotor shaft. Typically, the energization of the electromagnet is suitable for moving the second shaft to the second axial position, in particular for coupling the first shaft and the second shaft to the rotor shaft. The electromagnet is typically configured to exert a magnetic force on the second shaft during energization of the electromagnet, said magnetic force being at least as great as the restoring force of the at least one spring element pair on the second shaft at the second axial position.

The at least one spring element pair is typically configured to move the second shaft to the first axial position when the electromagnet is deenergized, in order to decouple the rotor shaft from the first shaft and the second shaft. In particular, in embodiments the at least one spring element pair can move the second shaft with a first toothing out of engagement with a second toothing of the rotor shaft. Typical embodiments can be embodied in particular as a coupling with a "fail-safe" function, wherein the coupling opens in the event of a failure or deactivation of the energization of the electromagnet. Typically, in the absence of the magnetic force, the second shaft is pulled in the direction of the first shaft and to the first axial position by the at least one spring element pair. In particular, the rotor shaft is decoupled from the first shaft and the second shaft. In embodiments, the first shaft and the second shaft are fixed or braked in relation to the housing.

In further typical embodiments, the electromagnet can be configured to exert a magnetic force on the second shaft in the direction of the first axial position and in particular to move it to the first axial position. The at least one spring element pair can be configured to produce a spring force on a second shaft arranged at the first axial position in the direction of the second axial position. In particular, the at least one spring element pair can be configured to move the second shaft from the first axial position to the second axial position when the electromagnet is deenergized. In particular, when the electromagnet is deenergized, the rotor shaft is coupled to the first shaft and the second shaft. The coupling can have a "fail-safe" function, in order to close the coupling in the event of a failure or deactivation of the energization of the electromagnet.

In further typical embodiments, the lifting device comprises, as an alternative or in addition to the electromagnet, a mechanical lifting device for providing a mechanical lifting force, a hydraulic lifting device for providing a hydraulic lifting force or a pneumatic lifting device for providing a pneumatic lifting force. Typically, the lifting device provides the lifting force, instead of or in addition to the magnetic force of the electromagnet, in the axial direction for coupling or decoupling of the coupling. The lifting force typically acts in the axial direction counter to the restoring force of the at least one spring element. In further typical embodiments, the lifting device comprises an electromagnet and a further mechanical, hydraulic or pneumatic lifting device, which provides a lifting force in the same axial direction as the restoring force. The electromagnet can be configured to apply a magnetic force in an axial direction counter to the lifting force and counter to the restoring force, in particular in order to overcome the lifting force and the restoring force and to move the second shaft axially in the direction of the magnetic force. In typical embodiments, the use of an electromagnet in a lifting device or as a lifting device can have the advantage that an electromagnet can be rapidly actuatable or can be of simple or compact construction. According to the embodiments described herein, the at least one spring element pair can be provided with a low restoring force, and therefore the electromagnet for applying the necessary magnetic force can be of small and lightweight dimensions.

In typical embodiments, the first shaft or the second shaft can have friction linings which, in a decoupled state of the coupling, clamp a friction disk fixedly connected to the housing of the coupling. Typically, both shafts have friction linings on the mutually facing planar faces. In particular, in the decoupled state of the coupling, a defined friction moment can be provided.

According to typical embodiments, the use of a shaft connection or of a coupling according to embodiments described herein is specified. The use typically comprises moving the second shaft relative to the first shaft in an axial direction, in particular in a first axial direction from a first axial position to a second axial position.

Shaft connections according to embodiments described herein typically provide a rigid transmission of torque between the first shaft and the second shaft with axial movability. In embodiments, a shaft connection can be used as a passive coupling element with length compensation, e.g. for compensation of thermal expansion.

When using a coupling, in particular in a method for actuating a coupling, the use can comprise coupling of the first shaft and of the second shaft to the rotor shaft. The coupling typically comprises providing a connection between the second shaft and the rotor shaft, in particular a positively locking or a frictionally locking connection. A positively locking connection can be produced in particular by engagement of a first toothing of the second shaft with a second toothing of the rotor shaft. A frictionally locking connection can be produced by frictional contact between the rotor shaft and the second shaft. The second shaft is typically moved using a lifting device according to embodiments described herein, in particular by energization of an electromagnet.

The use of a coupling typically comprises decoupling the first shaft and the second shaft from the rotor shaft. Typically, the decoupling comprises releasing a connection between the second shaft and the rotor shaft. By way of example, energization of the electromagnet can be deactivated. The restoring force of the at least one spring element pair can release the connection between the second shaft and the rotor shaft. In typical embodiments, the use of a shaft connection or coupling comprises moving the second shaft relative to the first shaft in a second axial direction that differs from the first axial direction. In particular, the second shaft can be moved from the second axial position to the first axial position, for example by the restoring force of the at least one spring element pair.

In embodiments, the first toothing of the second shaft can be in engagement with the second toothing of the rotor shaft in a rest position of the at least one spring element pair. The electromagnet in particular provides a holding force between the rotor shaft and the second shaft. When the energization of the electromagnet is deactivated, the first toothing and the second toothing can slide apart from one another as of a determined torque. The sliding apart of the toothings typically leads to a displacement of the second shaft in the direction of the first shaft and to a release of the coupling.

Compared with the prior art, typical embodiments can afford the advantage that torques can be transmitted between shafts in a play-free or torsionally stiff manner. Typical embodiments can provide a shaft connection stiffness that is independent of the direction of rotation. Embodiments can have a low weight. A further advantage can be that only a low lifting force counter to the restoring force of the at least one spring element pair is required for the axial movement of the second shaft relative to the first shaft. A spread of restoring forces in the case of mass-produced shaft connections can reliably be kept low. Embodiments can provide a relatively large axial travel with a relatively small diameter of the shaft connection. Typical couplings can be magnetically actuated, in particular rapidly switched. Embodiments can be produced in a simple, compact or cost-effective manner. A further advantage can be that embodiments can be equipped with a "fail-safe" function and can in particular be used in safety-critical applications. By way of example, embodiments can be used in aircraft, for example in load paths or powertrains of aircraft, in particular in control devices with force feedback.

BRIEF DESCRIPTION OF THE DRAWINGS

Further advantages and features of preferred embodiments of the invention will be explained below on the basis of the appended drawings, the figures showing.

DETAILED DESCRIPTION

Typical embodiments will be described below on the basis of the figures, wherein the invention is not restricted to the exemplary embodiments; instead the scope of the invention is determined by the claims. In the description of the figures, the same reference designations are used for the same or similar parts. In some instances, features which have already been described in connection with other figures are not described again for the sake of clarity. In some instances, features which are illustrated multiple times in a figure (for example details of the spring element pairs 9 in FIGS. 1A to 3) are only labeled with a reference sign once.

Figure 1A:
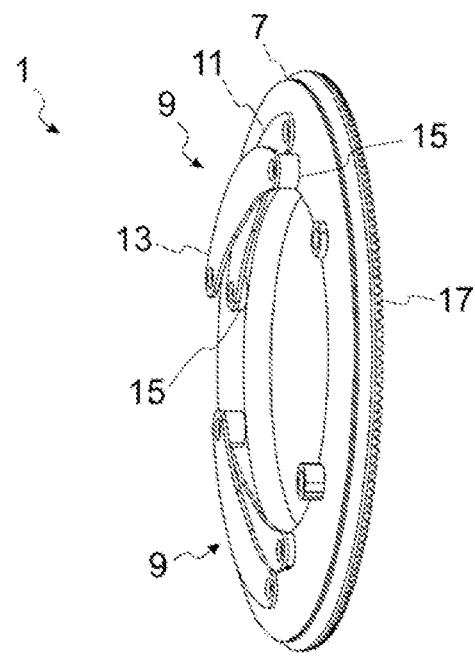
FIG. 1A shows a schematic view of a typical shaft connection, wherein the first shaft is not illustrated.
Figure 1B:
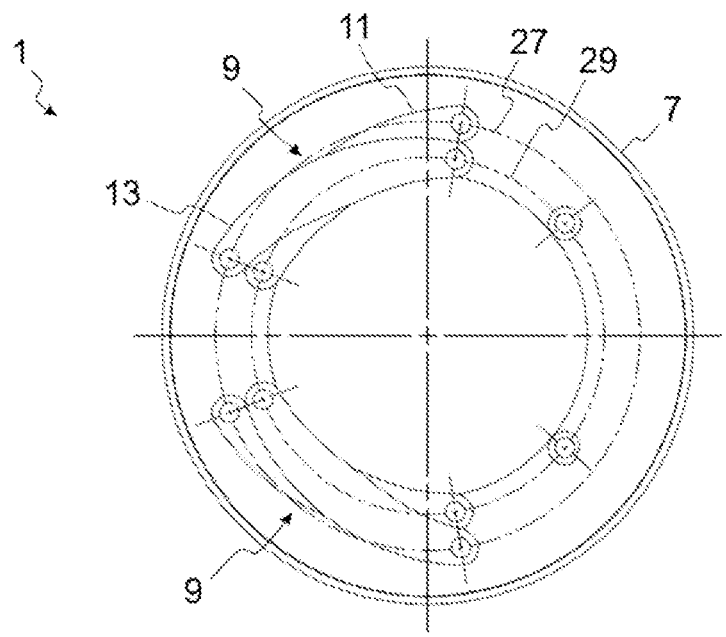
FIG. 1B shows a schematic view of the shaft connection in FIG. 1A along the axis of rotation.
Figure 1C:
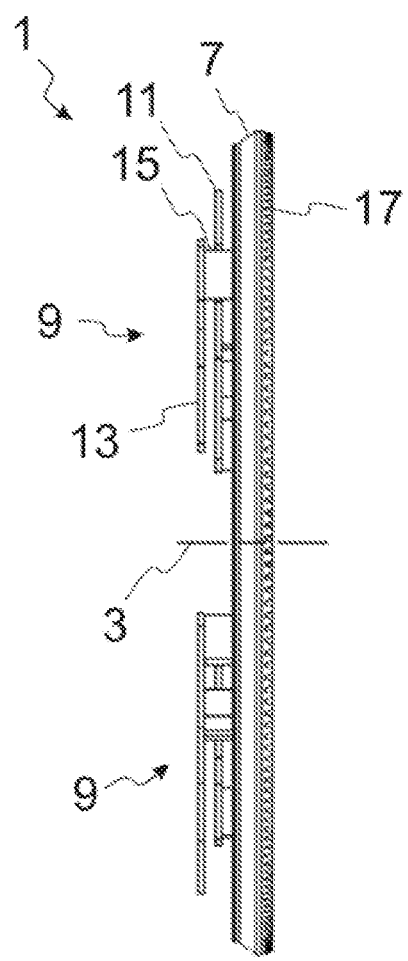
FIG. 1C shows a schematic side view of the shaft connection in FIG. 1A.

FIGS. 1A to 1C show schematic views of a shaft connection 1 comprising a second shaft 7 which is rotatable about an axis of rotation 3 and two spring element pairs 9 which are fastened to the second shaft 7. For the sake of clarity, a first shaft of the shaft connection 1 has been hidden in FIGS. 1A to 1C. The second shaft 7 is of circular-ring-shaped form. The second shaft 7 has a toothing 17 on the side facing away from the first shaft. By way of example, when using the shaft connection 1 in a coupling, the toothing 17 can serve for engagement with a further toothing of a rotor shaft.

The two spring element pairs 9 are fastened to the second shaft 7 on that side of the second shaft 7 which faces the first shaft. Each of the spring element pairs 9 comprises a first spring element 11 and a second spring element 13. The first spring element 11 and the second spring element 13 are each fastened to the second shaft 7, in particular by way of fastening means with spacers 15. The first spring element 11 and the second spring element 13 are each fastened to the second shaft 7 by way of a radially inner spring element end, the radially inner spring element end being arranged on a second circle 29 about the axis of rotation 3. Furthermore, the first spring element 11 and the second spring element 13 are each configured for fastening to the first shaft. The fastening of the first spring element 11 and of the second spring element 13 to the first shaft is effected in each case at a radially outer spring element end arranged on a first circle 27 about the axis of rotation 3.

As illustrated in FIGS. 1A and 1C, the first spring element 11 and the second spring element 13 of a spring element pair 9 are arranged axially offset relative to one another in the direction of the axis of rotation 3, in particular axially spaced apart. The first spring element 11 and the second spring element 13 are each in the form of elongate leaf springs. The first spring element 11 and the second spring element 13 are each oriented substantially orthogonal to the axis of rotation 3, as illustrated in FIG. 1C. In FIG. 1B, the leaf springs also extend substantially in the circumferential direction about the axis of rotation 3, the second spring element 13 crossing the first spring element 11 in the view along the axis of rotation 3. FIGS. 1A to 1C show a shaft connection with three spring element pairs 9, one spring element pair being hidden for the sake of clarity. In further embodiments, it is possible to provide merely one spring element pair or more than two spring element pairs.

Figure 2:
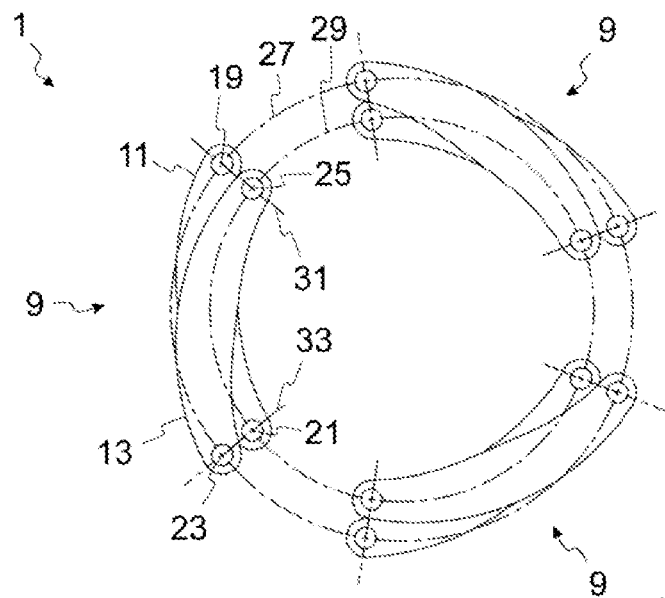
FIG. 2 shows a schematic view of an arrangement of spring element pairs according to a typical embodiment.

FIG. 2 shows an arrangement of three spring element pairs 9 which are arranged distributed uniformly in the circumferential direction about the axis of rotation. For the sake of clarity, FIG. 2 illustrates merely the spring element pairs 9 and the respective fastening positions. The first spring element 11 of a spring element pair 9 is fastened to the first shaft at a first fastening position 19 and to the second shaft at a second fastening position 21. The second spring element 13 of the spring element pair 9 is fastened to the first shaft at a third fastening position 23 and to the second shaft at a fourth fastening position 25. The first fastening position 19 of the first spring element 11 and the third fastening position 23 of the second spring element 13 lie on a first circle 27 about the axis of rotation for fastening to the first shaft. The second fastening position 21 of the first spring element 11 and the fourth fastening position 25 of the second spring element 13 lie on a second circle 29 for fastening to the second shaft, the second circle 29 having a smaller radius than the first circle 27.

The first spring element 11 and the second spring element 13 are arranged in a crossed manner, wherein in particular the first fastening position 19 of the first spring element 11 and the fourth fastening position 25 of the second spring element 13 lie at a first angular position 31 with respect to the axis of rotation. The second fastening position 21 of the first spring element 11 and the third fastening position 23 of the second spring element 13 lie at a second angular position 33 that differs from the first angular position 31. The first spring element 11 and the second spring element 13 extend over the same angular range. Although the arrangement of the spring elements has been described merely for one spring element pair 9, the spring elements of the two further spring element pairs 9 in FIG. 2 are also arranged offset in the circumferential direction correspondingly to the described arrangement.

Figure 3:
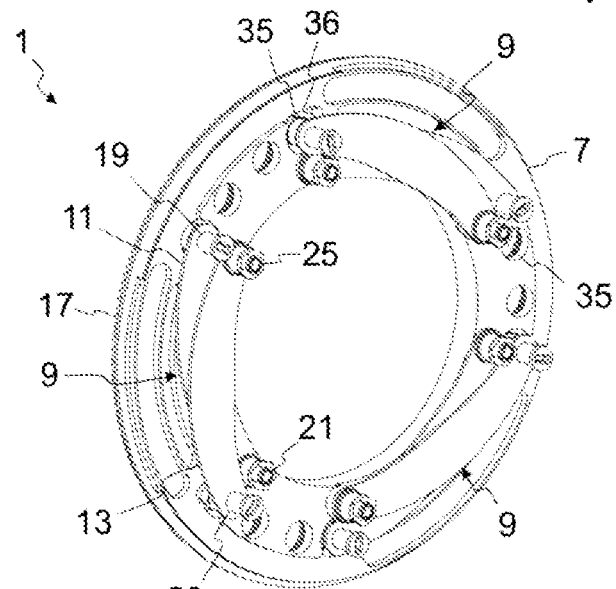
FIG. 3 shows a schematic view of a further typical shaft connection, wherein the first shaft is not illustrated.

FIG. 3 schematically shows a shaft connection 1 with spring element pairs 9 which are fastened, according to FIG. 2, to a first shaft (not illustrated) and to a second shaft 7. The spring elements are connected to the first shaft and the second shaft 7 by way of fastening means 35. In embodiments, the second shaft 7 has, at fastening positions provided for fastening spring elements to the first shaft, a respective cutout 36 around the respective fastening means 35. In particular, the spring elements can be mounted through the cutout 36 by means of the fastening means 35.

Figure 4:
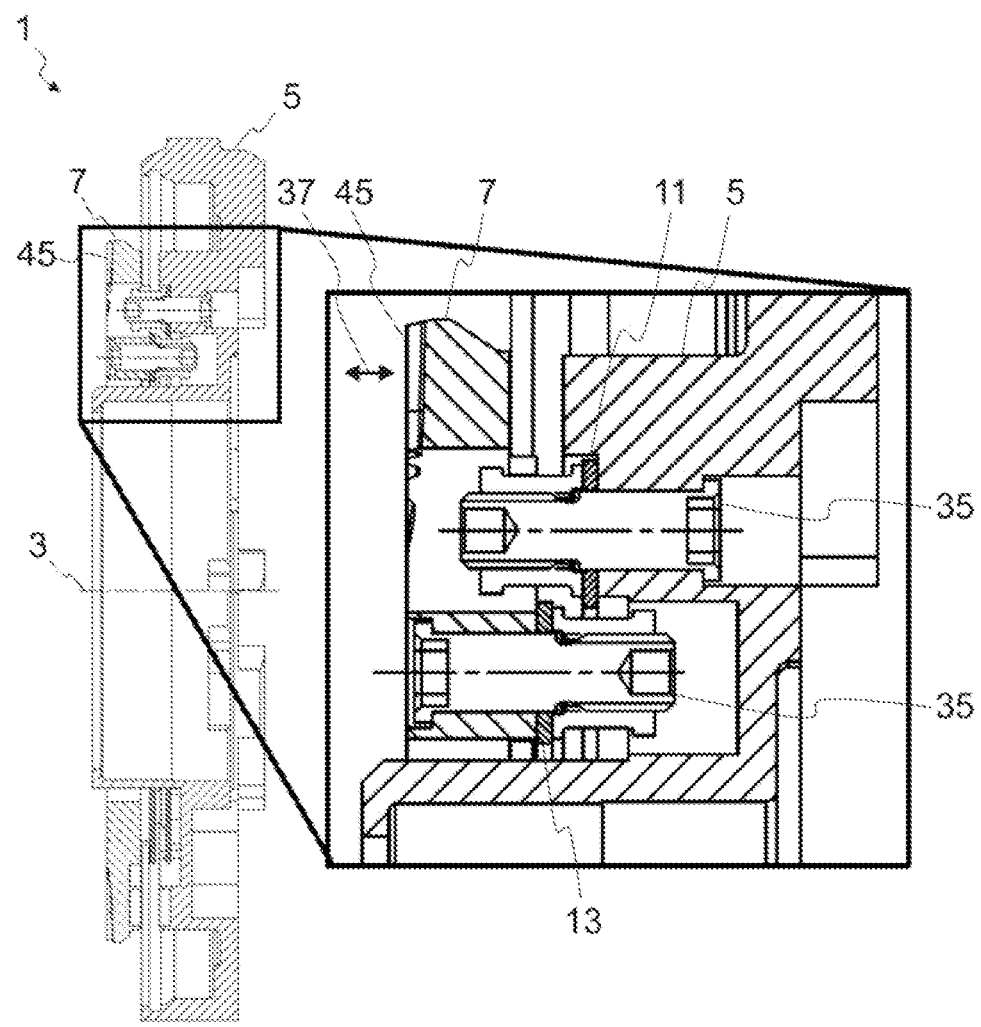
FIG. 4 shows a detail of a coupling with a shaft connection according to one embodiment.

FIG. 4 shows a detail of a typical coupling, wherein the detail in particular illustrates a shaft connection 1 for connecting a first shaft 5 and a second shaft 7. The second shaft 7 has a first toothing 45 for coupling to a rotor shaft that is not illustrated in FIG. 4. Both shafts are of ring-shaped form and each comprise a radial region in which both shafts extend. The overlapping radial region is illustrated in enlarged form in the detail view in FIG. 4. In the overlapping radial region, the two shafts are arranged one behind the other and connected by spring element pairs which are arranged distributed in the circumferential direction about the axis of rotation 3. Each spring element pair comprises a first spring element 11 and a second spring element 13, which are each in the form of a leaf spring, for example as illustrated in FIGS. 1 to 3. The leaf springs are each fastened to the first shaft 5 and to the second shaft 7 by way of fastening means 35. The second shaft 7 is illustrated in a first axial position in which the spring elements are not deflected and the second shaft 7 is decoupled from a rotor shaft that is not illustrated in FIG. 4. The second shaft 7 can be moved in the axial direction 37, in particular to a second axial position which is further away from the first shaft 5 than the first axial position.

Figure 5:
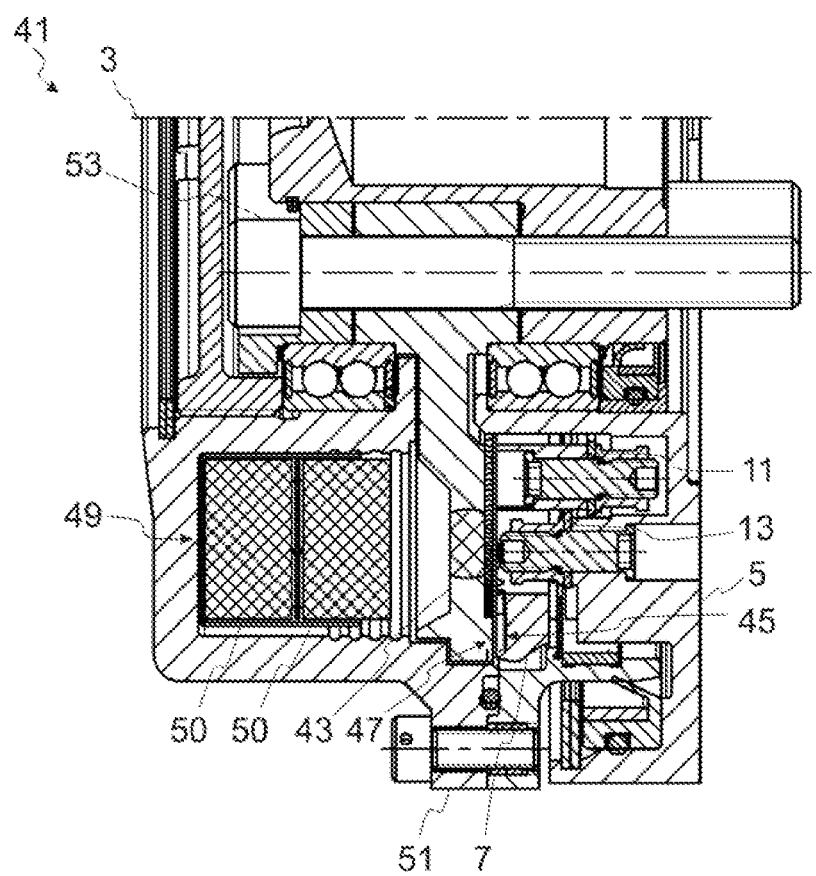
FIG. 5 shows a further detail of the coupling in FIG. 4 with further components of the coupling.

FIG. 5 shows a further detail of the coupling 41 illustrated in FIG. 4 with further components of the coupling 41, only one half of the sectional view of the coupling 41 being illustrated. The coupling 41 comprises a housing 51, a rotor shaft 43 and a shaft connection comprising spring element pairs, a first shaft 5 and a second shaft 7. The housing 51 is secured against rotation. The rotor shaft 43 can be connected to a shaft of an electric motor (not illustrated) for example by means of screws 53. The first shaft 5, the second shaft 7 and the rotor shaft 43 are rotatable coaxially about an axis of rotation 3.

On that side of the second shaft 7 which faces the rotor shaft 43, the second shaft 7 has a first toothing 45 for engagement with a second toothing 47 of the rotor shaft 43. FIG. 5 shows the second shaft 7 in a first axial position in which the spring elements are not subjected to loading. The coupling 41 further comprises an electromagnet 49 with magnet coils 50. The electromagnet 49 is configured to produce a magnetic force on the second shaft 7 when the magnet coils 50 are energized, such that the second shaft 7 is pulled counter to the restoring force of the spring elements in the direction of the rotor shaft 43 into a second axial position in which the first toothing 45 of the second shaft 7 engages into the second toothing 47 of the rotor shaft. In particular, when the magnet coils 50 are energized, the electromagnet closes a magnetic circuit through the housing 51, the rotor shaft 43 and the second shaft 7.

Figure 6:
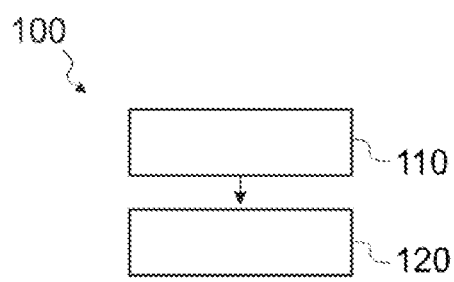
FIG. 6 shows a flow diagram of the use of a coupling according to one embodiment.

FIG. 6 shows a flow diagram of the use 100 of a coupling 41, as illustrated for example in FIG. 5. In block 110, the second shaft 7 is moved in a first axial direction for the coupling of the first shaft 5 and of the second shaft 7 to the rotor shaft 43. To move the second shaft 7, the electromagnet 49 is energized. The second shaft 7 is pulled from a first axial position on the first shaft 5 into a second axial position by the magnetic force of the electromagnet 49, wherein the spring element pairs are preloaded in a play-free manner. At the second axial position, the first toothing 45 of the second shaft 7 engages into the second toothing 47 of the rotor shaft 43. With the engagement of the toothings, the first shaft 5, the second shaft 7 and the rotor shaft 43 are coupled in a play-free manner and in a torsionally stiff manner in both directions of rotation.

In block 120, the second shaft 7 is moved in a second axial direction, which is different from the first axial direction, for the decoupling of the first shaft 5 and of the second shaft 7 from the rotor shaft 43. In particular, the energization of the electromagnet 49 is deactivated. The spring element pairs pull the second shaft back into the first axial position, the first toothing being moved out of the second toothing 47. In particular, the rotor shaft 43 is decoupled from the first shaft 5 and the second shaft 7. The coupling 41 in FIG. 5 has a "fail-safe" function, in which the rotor shaft 43 is decoupled from the first shaft 5 and the second shaft 7 in the event of a failure or deactivation of the electromagnet 49.

The invention claimed is:

1. Shaft connection (1) comprising
a first shaft (5) which is rotatable about an axis of rotation (3),
a second shaft (7) which is arranged coaxially with the first shaft (5) and which is movable axially relative to the first shaft (5), and
at least one spring element pair (9), in each case comprising a first spring element (11) and a second spring element (13),
wherein the first spring element (11) and the second spring element (13) are each fastened to the first shaft (5) and to the second shaft (7), and wherein the first spring element (11) and the second spring element (13) are arranged axially offset relative to one another, wherein the first spring element (11) and the second spring element (13) are arranged in a crossed manner.

2. Shaft connection (1) according to claim 1, wherein the first shaft (5) and the second shaft (7) are arranged one behind the other in an axial direction.

3. Shaft connection (1) according to claim 1, wherein the first spring element (11) and the second spring element (13) are each in the form of a leaf spring.

4. Shaft connection (1) according to claim 3, wherein the leaf spring is oriented at least substantially parallel to a plane orthogonal to the axis of rotation (3).

5. Shaft connection (1) according to claim 3, wherein the leaf spring is of arcuate form.

6. Shaft connection (1) according to claim 3, wherein the leaf spring extends substantially in a circumferential direction about the axis of rotation (3).

7. Shaft connection (1) according to claim 1, comprising at least two spring element pairs (9), wherein the at least two spring element pairs (9) are arranged distributed in the circumferential direction about the axis of rotation (3).

8. Shaft connection (1) according to claim 1, wherein the first spring element (11) and the second spring element (13) each extend over the same angular range about the axis of rotation (3).

9. Shaft connection (1) according to claim 1, wherein the first spring element (11) and the second spring element (13) each have a fastening position on a first circle (27) about the axis of rotation (3) on the first shaft (5), and wherein the first spring element (11) and the second spring element (13) each have a further fastening position on a second circle (29) about the axis of rotation (3) on the second shaft (7), and wherein the first circle (27) has a different radius than the second circle (29).

10. Shaft connection (1) according to claim 1, wherein the second shaft (7) has a toothing (17).

11. Shaft connection (1) according to claim 1, wherein the first shaft (5) and/or the second shaft (7) are/is of circular-ring-shaped form.

12. Coupling (41) comprising
a shaft connection (1) according to claim 1, and
a rotor shaft (43) arranged coaxially with the first shaft (5) and the second shaft (7),
wherein, for the coupling of the first shaft (5) and the second shaft (7) to the rotor shaft (43), the coupling (41) is configured to move the second shaft (7) axially in the direction of the rotor shaft (43).

13. Coupling (41) according to claim 12, wherein the second shaft (7) has a first toothing (45), and wherein the rotor shaft (43) has a second toothing (47) configured to engage with the first toothing (45).

14. Coupling (41) according to claim 12, further comprising an electromagnet (49) configured to move the second shaft (7) counter to a restoring force of the at least one spring element pair (9) from a first axial position to a second axial position.

15. Shaft connection (1) according to claim 1, wherein the first spring element and the second spring element cross in a view along the axis of rotation.

* * * * *